US012568283B2

(12) United States Patent
Chan et al.

(10) Patent No.: US 12,568,283 B2
(45) Date of Patent: *Mar. 3, 2026

(54) METHODS, SYSTEMS, AND MEDIA FOR PROVIDING DYNAMIC MEDIA SESSIONS WITH AUDIO STREAM EXPANSION FEATURES

(71) Applicant: Google LLC, Mountain View, CA (US)

(72) Inventors: Christopher Chan, San Francisco, CA (US); Kenneth J. MacKay, Mountain View, CA (US); James Carroll West, Mountain View, CA (US)

(73) Assignee: Google LLC, Mountain View, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/977,256

(22) Filed: Oct. 31, 2022

(65) Prior Publication Data

US 2023/0053256 A1 Feb. 16, 2023

Related U.S. Application Data

(63) Continuation of application No. 17/006,004, filed on Aug. 28, 2020, now Pat. No. 11,553,254.

(60) Provisional application No. 62/946,682, filed on Dec. 11, 2019.

(51) Int. Cl.
| *H04N 21/485* | (2011.01) |
| *H04N 21/262* | (2011.01) |
| *H04N 21/81* | (2011.01) |
| *H04N 21/8547* | (2011.01) |

(52) U.S. Cl.
CPC ... *H04N 21/4852* (2013.01); *H04N 21/26225* (2013.01); *H04N 21/8106* (2013.01); *H04N 21/8547* (2013.01)

(58) Field of Classification Search
CPC ......... H04N 21/4852; H04N 21/26225; H04N 21/8106; H04N 21/8547; H04N 21/43615; H04N 21/47217
See application file for complete search history.

(56) References Cited

U.S. PATENT DOCUMENTS

| 9,820,323 | B1 * | 11/2017 | Young ..................... H04W 4/80 |
| 10,555,031 | B1 * | 2/2020 | Almeida .......... H04N 21/42225 |
| 2008/0147558 | A1 | 6/2008 | Kraus |
| 2013/0094667 | A1 | 4/2013 | Millington et al. |

(Continued)

*Primary Examiner* — Richard A Hansell, Jr.
(74) *Attorney, Agent, or Firm* — Lerner David LLP

(57) ABSTRACT

Methods, systems, and media for providing dynamic media sessions with audio stream expansion features are provided. In some embodiments, the methods include: receiving an indication that audio content associated with a video content item is to be presented by a follower device synchronously with the audio content presented by the leader device; identifying candidate follower devices by determining whether devices connected to a local area network are capable of being designated as a follower device; causing a user interface to be presented that indicates each candidate follower device; receiving, via the user interface, a selection of one of the candidate follower devices; and transmitting, from the leader to the selected follower device, control instructions that cause the audio content associated with the video content item to be presented synchronously by the selected follower device with the video content item presented by the leader device.

11 Claims, 4 Drawing Sheets

(56) References Cited

U.S. PATENT DOCUMENTS

| | | | |
|---|---|---|---|
| 2014/0093085 A1 | 4/2014 | Jarvis et al. | |
| 2014/0153909 A1 | 6/2014 | MacInnis et al. | |
| 2015/0114574 A1 | 4/2015 | Fiedler et al. | |
| 2015/0208161 A1 | 7/2015 | Lesaffre | |
| 2015/0358767 A1* | 12/2015 | Luna | H04W 4/029 |
| | | | 455/456.1 |
| 2017/0018002 A1* | 1/2017 | Champy | G06Q 30/0251 |
| 2017/0048373 A1* | 2/2017 | Dees | H04N 21/41407 |
| 2017/0181113 A1 | 6/2017 | Keyser-Allen et al. | |
| 2017/0329572 A1* | 11/2017 | Shah | G06F 3/167 |
| 2018/0027301 A1* | 1/2018 | Deshpande | H04N 21/6405 |
| | | | 725/88 |
| 2018/0115827 A1* | 4/2018 | Tanaka | H04S 7/00 |
| 2018/0343492 A1* | 11/2018 | Konig | H04N 21/43615 |
| 2019/0132692 A1 | 5/2019 | Millington et al. | |
| 2019/0364346 A1* | 11/2019 | Gupta | H04N 21/4112 |
| 2020/0014969 A1* | 1/2020 | Lau | H04N 21/4305 |
| 2020/0183640 A1* | 6/2020 | Kitson | G06F 3/0482 |
| 2020/0314539 A1* | 10/2020 | Borowski | H04N 7/142 |

* cited by examiner

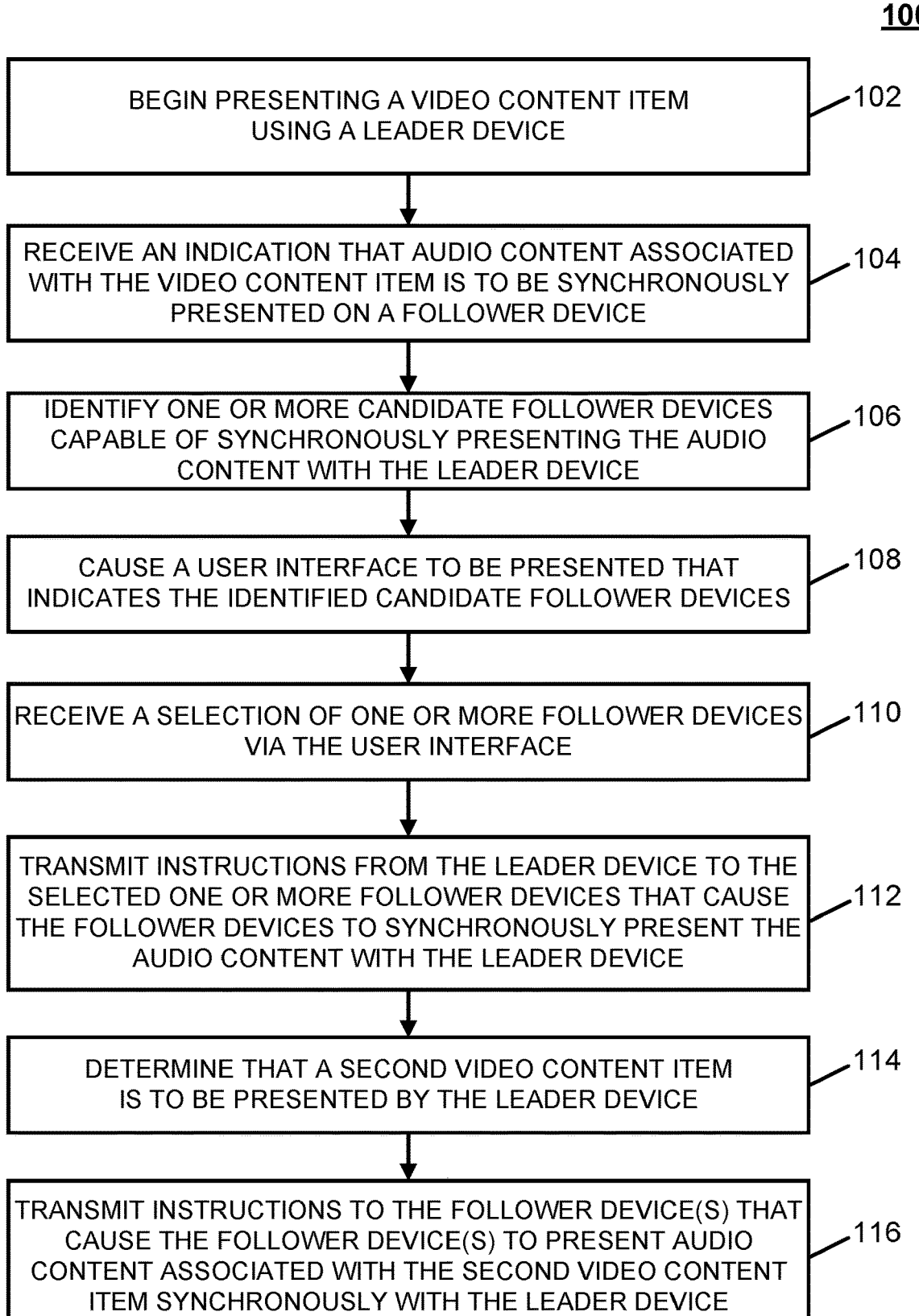

100

BEGIN PRESENTING A VIDEO CONTENT ITEM USING A LEADER DEVICE ⟋102

RECEIVE AN INDICATION THAT AUDIO CONTENT ASSOCIATED WITH THE VIDEO CONTENT ITEM IS TO BE SYNCHRONOUSLY PRESENTED ON A FOLLOWER DEVICE ⟋104

IDENTIFY ONE OR MORE CANDIDATE FOLLOWER DEVICES CAPABLE OF SYNCHRONOUSLY PRESENTING THE AUDIO CONTENT WITH THE LEADER DEVICE ⟋106

CAUSE A USER INTERFACE TO BE PRESENTED THAT INDICATES THE IDENTIFIED CANDIDATE FOLLOWER DEVICES ⟋108

RECEIVE A SELECTION OF ONE OR MORE FOLLOWER DEVICES VIA THE USER INTERFACE ⟋110

TRANSMIT INSTRUCTIONS FROM THE LEADER DEVICE TO THE SELECTED ONE OR MORE FOLLOWER DEVICES THAT CAUSE THE FOLLOWER DEVICES TO SYNCHRONOUSLY PRESENT THE AUDIO CONTENT WITH THE LEADER DEVICE ⟋112

DETERMINE THAT A SECOND VIDEO CONTENT ITEM IS TO BE PRESENTED BY THE LEADER DEVICE ⟋114

TRANSMIT INSTRUCTIONS TO THE FOLLOWER DEVICE(S) THAT CAUSE THE FOLLOWER DEVICE(S) TO PRESENT AUDIO CONTENT ASSOCIATED WITH THE SECOND VIDEO CONTENT ITEM SYNCHRONOUSLY WITH THE LEADER DEVICE ⟋116

FIG. 1

METHODS, SYSTEMS, AND MEDIA FOR PROVIDING DYNAMIC MEDIA SESSIONS WITH AUDIO STREAM EXPANSION FEATURES

CROSS-REFERENCE TO RELATED APPLICATIONS

This application is a continuation of U.S. Non-Provisional patent application Ser. No. 17/006,004, filed Aug. 28, 2020, which claims the benefit of U.S. Provisional Patent Application No. 62/946,682, filed Dec. 11, 2019, which is hereby incorporated by reference herein in its entirety.

TECHNICAL FIELD

The disclosed subject matter relates to methods, systems, and media for providing dynamic media sessions with audio stream expansion features.

BACKGROUND

With the increase in networked media devices, users may generally be interested in combining multiple devices to consume media content, thereby creating a richer media experience. For example, a user may want to begin watching a video content item on a first device with a display (e.g., a television, a mobile phone, a tablet computer, a virtual assistant device, etc.), and then cause audio content associated with the video content item to be synchronously presented from other devices (e.g., nearby speakers, etc.) to provide a richer audio experience.

However, it can sometimes be difficult to identify devices that are capable of synchronously presenting audio content associated with a video content item. For example, in some cases, a first device that begins presenting a video content item can be considered a leader device, and devices that synchronously present audio content associated with the video content item can be considered follower devices. Continuing with this example, in some cases, it can be difficult to identify follower devices capable of synchronously presenting content with a leader device.

Accordingly, it is desirable to provide new methods, systems, and media for providing dynamic media sessions with audio stream expansion features.

SUMMARY

Methods, systems, and media for providing dynamic media sessions with audio stream expansion features are provided.

In accordance with some embodiments of the disclosed subject matter, a method for media playback is provided, the method comprising: causing a video content item to begin being presented by a leader device; receiving an indication that audio content associated with the video content item is to be presented by a follower device synchronously with the audio content presented by the leader device; identifying a plurality of devices connected to the local area network; identifying a group of candidate follower devices by determining whether each of the plurality of devices connected to the local area network is capable of being designated as a follower device; causing a user interface to be presented that indicates each candidate follower device in the identified group of candidate follower devices; receiving, via the user interface, a selection of one of the candidate follower devices in the group of candidate follower devices; and transmitting, from the leader to the selected follower device, control instructions that cause the audio content associated with the video content item to be presented synchronously by the selected follower device with the video content item presented by the leader device.

In some embodiments, determining whether each of the plurality of devices is capable of being designated as a follower device is based on whether a user of the leader device has purchased a subscription to a service that provides the video content item.

In some embodiments, determining whether each of the plurality of devices is capable of being designated as a follower device is based on whether each device in the plurality of devices has a display screen.

In some embodiments, transmitting the control instructions comprises transmitting audio timestamps in connection with audio data corresponding to the audio content associated with the video content item.

In some embodiments, the method further comprises: determining that a second video content item is to be presented by the leader device; modifying, by the leader device, video timestamps associated with video data associated with the second video content item and audio timestamps associated with audio data associated with audio content of the second video content item to have a delay of a predetermined duration; transmitting, from the leader device to the selected follower device, second control instructions that include the modified audio timestamps and the audio data associated with the audio content of the second video content item; and causing the video data to be presented by the leader device after the predetermined duration has elapsed based on the modified video timestamps.

In some embodiments, the method further comprises transmitting, from the leader device to the selected follower device, third control instructions that include silent audio data during the delay of the predetermined duration.

In some embodiments, the method further comprises presenting an error message in the user interface in response to determining that at least one device in the identified plurality of devices is not capable of being designated a follower device.

In some embodiments, the user interface is caused to be presented on one of the plurality of devices.

In some embodiments, the user interface is caused to be presented on a mobile device connected to the leader device.

In some embodiments, the indication that audio content associated with the video content item is to be presented by the follower device synchronously with the audio content presented by the leader device is received via a voice command.

In accordance with some embodiments of the disclosed subject matter, a system for media playback is provided, the system comprising a hardware processor of a leader device that: causes a video content item to begin being presented by the leader device; receives an indication that audio content associated with the video content item is to be presented by a follower device synchronously with the audio content presented by the leader device; identifies a plurality of devices connected to the local area network; identifies a group of candidate follower devices by determining whether each of the plurality of devices connected to the local area network is capable of being designated as a follower device; causes a user interface to be presented that indicates each candidate follower device in the identified group of candidate follower devices; receives, via the user interface, a selection of one of the candidate follower devices in the group of candidate follower devices; and transmits, from the leader to the selected follower device, control instructions that cause the audio content associated with the video content item to be presented synchronously by the selected follower device with the video content item presented by the leader device.

In accordance with some embodiments of the disclosed subject matter, a non-transitory computer-readable medium containing computer executable instructions that, when executed by a processor, cause the processor to perform a method for media playback is provided, the method comprising: causing a video content item to begin being presented by a leader device; receiving an indication that audio content associated with the video content item is to be presented by a follower device synchronously with the audio content presented by the leader device; identifying a plurality of devices connected to the local area network; identifying a group of candidate follower devices by determining whether each of the plurality of devices connected to the local area network is capable of being designated as a follower device; causing a user interface to be presented that indicates each candidate follower device in the identified group of candidate follower devices; receiving, via the user interface, a selection of one of the candidate follower devices in the group of candidate follower devices; and transmitting, from the leader to the selected follower device, control instructions that cause the audio content associated with the video content item to be presented synchronously by the selected follower device with the video content item presented by the leader device.

In accordance with some embodiments of the disclosed subject matter, a system for media playback is provided, the system comprising: means for causing a video content item to begin being presented by a leader device; means for receiving an indication that audio content associated with the video content item is to be presented by a follower device synchronously with the audio content presented by the leader device; means for identifying a plurality of devices connected to the local area network; means for identifying a group of candidate follower devices by determining whether each of the plurality of devices connected to the local area network is capable of being designated as a follower device; means for causing a user interface to be presented that indicates each candidate follower device in the identified group of candidate follower devices; means for receiving, via the user interface, a selection of one of the candidate follower devices in the group of candidate follower devices; and means for transmitting, from the leader to the selected follower device, control instructions that cause the audio content associated with the video content item to be presented synchronously by the selected follower device with the video content item presented by the leader device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1 shows an illustrative example of a process for causing a follower device to begin synchronously presenting audio content with a leader device presenting a video content item in accordance with some embodiments of the disclosed subject matter.

DETAILED DESCRIPTION

Figure 2A:
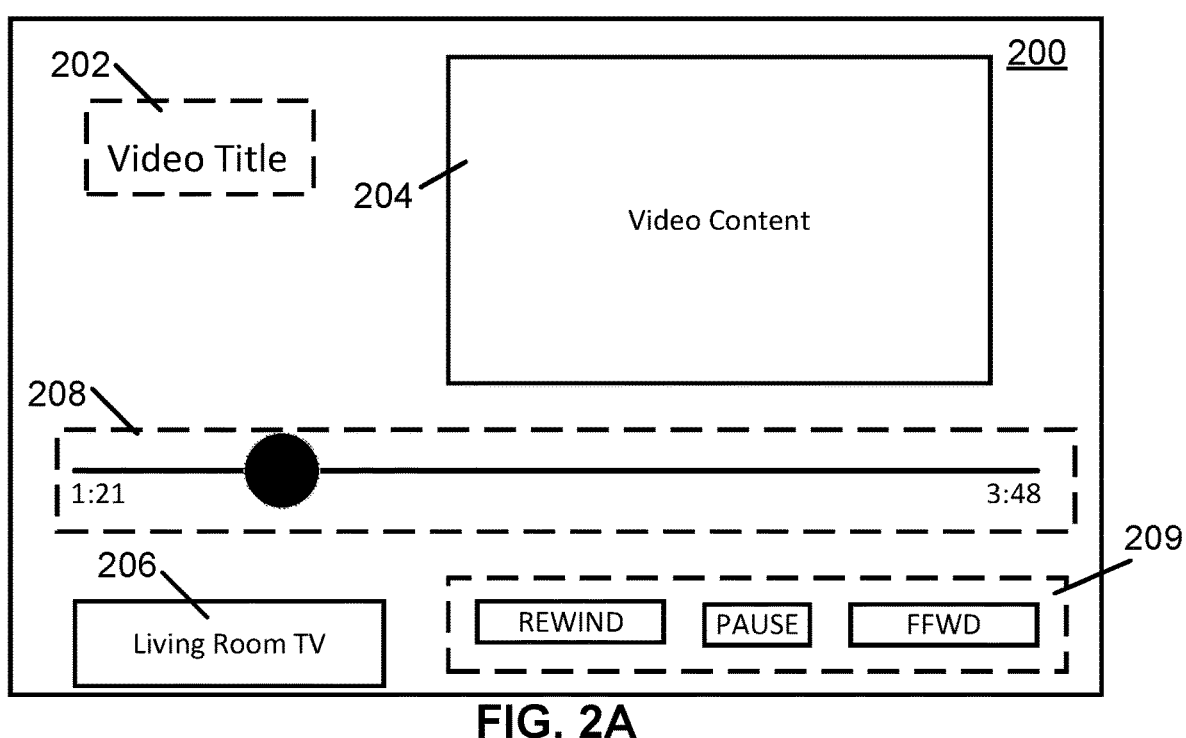
FIGS. 2A and 2B show illustrative examples of user interfaces for identifying and selecting follower devices in accordance with some embodiments of the disclosed subject matter.

In accordance with various embodiments, mechanisms (which can include methods, systems, and media) for providing dynamic media sessions with audio stream expansion features are provided.

In some embodiments, the mechanisms described herein can begin presenting a video content item on a leader device (e.g., a television, a streaming media device associated with a television or other display, a mobile phone, a virtual assistant device with a display, a tablet computer, a desktop computer, a laptop computer, and/or any other suitable device). In some embodiments, the mechanisms can then cause audio content associated with the video content item to be synchronously presented on both the leader device and a selected follower device (e.g., speakers, a virtual assistant device, a streaming media device, and/or any other suitable device). In some embodiments, the mechanisms can receive an indication of the selected follower device in any suitable manner, such as via a user interface that indicates identified candidate follower devices, as shown in and described below in connection with FIG. 2B. Note that, in some embodiments, multiple follower devices can be selected, and, in such cases, the mechanisms described herein can cause each of the multiple follower devices to synchronously present the audio content with the leader device.

In some embodiments, the mechanisms described herein can cause the audio content to be synchronously presented by the leader device and the selected follower device(s) in any suitable manner and using any suitable technique(s). For example, in some embodiments, the leader device can transmit control instructions to the selected follower device(s) that includes audio data corresponding to the audio content associated with the video content item in connection with audio timestamps that indicate times at which the selected follower device(s) is/are to present the audio data, thereby causing the selected follower device(s) to synchronously present the audio content with the leader device. In such embodiments, synchrony of presentation of the audio content by the leader device and the selected follower device(s) can be maintained in any suitable manner. For example, in some embodiments, the leader device can transmit updated control instructions (e.g., that include updated audio timestamps, and/or that include any other suitable information) to each of the selected follower devices at any suitable frequency (e.g., every five seconds, every ten seconds, and/or any other suitable frequency, which can be used by the selected follower device(s) to maintain synchrony of presentation of the audio content with the leader device.

In some embodiments, the mechanisms described herein can identify candidate follower devices based on any suitable information. For example, as described below in more detail in connection with FIG. 1, in some embodiments, the mechanisms can identify devices using any suitable device discovery protocol (e.g., to identify devices connected to a same local area network as a leader device, and/or any other suitable devices), and can determine whether each of the identified devices is capable of being designated as a follower device and/or is capable of presenting audio content synchronously with the leader device. In some embodiments, the mechanisms can determine whether each device is capable of being designated a follower device based on any suitable information, such as a type of device of each identified device, whether an identified device has a built-in screen, and/or any other suitable information.

In some embodiments, the mechanisms can determine whether an identified device is to be designated a candidate follower device based on whether a user of the leader device has purchased a particular subscription (e.g., a subscription to a service that provides the video content item, and/or any other suitable subscription) and/or a particular level of subscription to a service (e.g., a premium-level subscription, and/or any other suitable level). In some embodiments, the mechanisms can, in response to determining that the user has not purchased a subscription to the service and/or has not purchased a particular level of subscription, determine that particular identified devices are to be inhibited from being designated as follower devices. For example, in some embodiments, in response to determining that the user has not purchased a subscription to the service and/or has not purchased a particular level of subscription, the mechanisms can determine that identified devices that do not have screens (e.g., speakers, and/or any other suitable screenless devices) are not to be designated as a candidate follower device.

Turning to FIG. 1, an illustrative example 100 of a process for providing dynamic media sessions with audio stream expansion features is shown in accordance with some embodiments of the disclosed subject matter. In some embodiments, blocks of process 100 can be executed by a leader device on which presentation of a video content item is initiated. Note that, in some embodiments, the leader device can include any suitable type of user device capable of presenting a video content item, such as a television, a television paired with or coupled to a streaming media device, a smart television, a tablet computer, a mobile phone, a laptop computer, a desktop computer, a virtual assistant device that includes a display, and/or any other suitable type of device.

At 102 of process 100, the leader device can begin presenting a video content item. In some embodiments, the leader device can begin presenting the video content item in any suitable manner. For example, in some embodiments, the leader device can begin presenting a video content item by causing video content of the video content item to be presented on a display associated with the leader device. As another example, in some embodiments, the leader device can begin presenting audio content associated with the video content item using speakers associated with the leader device. Note that, in some embodiments, the video content item can be any suitable type of video content item (e.g., a video, a music video, a movie, a television show, live-streamed video content, and/or any other suitable type of video content item). Additionally, note that, in some embodiments, the video content item can be a video content item that is stored locally on the leader device. Additionally or alternatively, in some embodiments, the video content item can be a video content item that is stored on a server (e.g., a server associated with a video sharing service, a server associated with a social networking service, and/or any other suitable server) that is streamed from the server by the leader device.

In some embodiments, the leader device can present the video content item within any suitable user interface. Turning to FIG. 2A, an example 200 of a user interface for presenting the video content item on a leader device is shown in accordance with some embodiments of the disclosed subject matter. As illustrated, in some embodiments, user interface 200 can include video information 202, video content 204, a leader device indicator 206, a video playback indicator 208, and/or playback controls 209.

In some embodiments, video information 202 can indicate a title of the video content item, such as shown in FIG. 2A. In some embodiments, video information 202 can include any other suitable information about the video content item, such as a channel to which the video content item was uploaded and/or is otherwise associated, a name of a creator of the video content item, a date associated with the video content item (e.g., a date the video content item was created, a date the video content item was uploaded to a video sharing service or other service, and/or any other suitable date), and/or any other suitable information.

In some embodiments, video content 204 can include presentation of video content associated with the video content item. Note that, in some embodiments, a window in which video content 204 is presented can have any suitable size. In some embodiments, the window can be resized in any suitable manner (e.g., maximized to take up an entirety of a display of the leader device, enlarged or shrunk to any suitable size, and/or changed in any other suitable manner). For example, in some embodiments, video content 204 can be resized to take up a majority of a display of the leader device and/or an entirety of the display of the leader device. Continuing with this example, in some embodiments, other content included in user interface 200 (e.g., video title 202, leader device indicator 206, video playback indicator 208, and/or any other suitable content) can be hidden or made smaller in size.

In some embodiments, leader device indicator 206 can include any suitable information, such as a name of the leader device (e.g., "living room TV," "mobile phone," "bedroom TV," and/or any other suitable name). In some embodiments, leader device indicator 206 can include any suitable icon(s) that indicates any suitable information, such as a type of device associated with the leader device (e.g., that the leader device is a television, that the leader device is a mobile phone, that the leader device is a laptop computer, and/or any other suitable device type information), an indication of an owner of the leader device (e.g., an icon that includes an initial of the owner, an image that includes a profile photo of the owner, and/or any other suitable owner indication), and/or any other suitable information. Note that, in some embodiments, leader device indicator 206 can be selectable. In such embodiments, in response to determining that leader device indicator 206 has been selected, the leader device can present a user interface that allows additional audio devices to be selected to synchronously present audio content associated with the video content item, as shown in and described below in connection with FIG. 2B and blocks 104-108 of FIG. 1.

In some embodiments, video playback indicator 208 can indicate a duration of the video content item and/or how much of the video content item has elapsed at a current time, as shown in FIG. 2A.

In some embodiments, user interface 200 can include playback controls 209 that can be used to modify playback of the video content item. As a more particular example, in some embodiments, as shown in FIG. 2A, user interface 200 can include a rewind button, a pause button, and/or a fast-forward button. In some embodiments, user interface 200 can additionally or alternatively include volume controls that can be used to adjust a volume of audio content associated with the video content item.

Additionally, note that, in some embodiments, user interface 200 can be presented on a device other than the leader device that is presenting the video content item. For example, in some embodiments, user interface 200 can be presented on a mobile device (e.g., a mobile phone, a tablet computer, a wearable computer, and/or any other suitable user device) that is paired with the leader device (e.g., via a local area network, via a BLUETOOTH connection, and/or in any other suitable manner).

Referring back to FIG. 1, at 104 of process 100, the leader device can receive an indication that audio content associated with the video content item is to be synchronously presented by a follower device. In some embodiments, the leader device can receive the indication in any suitable manner. For example, in some embodiments, the leader device can receive the indication via a user interface, such as user interface 200 as shown in and described above in connection with FIG. 2A. As a more particular example, in some embodiments, the leader device can receive the indication in response to determining that leader device indicator 206 as shown in FIG. 2A has been selected. As another more particular example, in some embodiments, user interface 200 can include a selectable icon that, when selected, indicates that audio content associated with the video content is to be synchronously presented by a follower device. As yet another more particular example, in some embodiment, the leader device can receive a voice command indication (e.g., a voice query of "OK DEVICE, I WANT TO ADD THIS TO MORE SPEAKERS.")

In some embodiments, the leader device can determine that the audio content associated with the video content item has a format that cannot be decoded by an associated decoder. In response to such a determination, the leader device can prevent one or more follower devices from being added to present the audio content associated with the video content item. For example, the leader device can use a decryption application programming interface to decrypt an audio stream from the video content item and, in response to determining that the decryption application programming interface cannot decrypt an audio stream from the video content item, the leader device can prevent one or more follower devices from being added to present the audio content associated with the video content item.

At 106 of process 100, the leader device can identify one or more candidate follower devices capable of synchronously presenting the audio content associated with the video content item. In some embodiments, the leader device can identify the one or more candidate follower devices in any suitable manner and using any suitable technique(s). For example, in some embodiments, the leader device can use any suitable device discovery protocol to identify the one or more candidate follower devices connected to a same communication network that the leader device is connected to, such as a local Wi-Fi network in a home of a user of the leader device, and/or any other suitable communication network. Note that, in some embodiments, an identified device can be connected to a Wi-Fi network directly or via a streaming media interface that is connected (e.g., via an HDMI connection, and/or connected in any other suitable manner) to the device. As a more particular example, in some embodiments, the leader device can identify the one or more candidate follower devices via mDNS, Discovery and Launch (DIAL), and/or using any other suitable protocol(s).

In some embodiments, the leader device can identify one or more devices using any suitable device discovery protocol and can subsequently determine whether each of the discovered devices is capable of presenting the audio content associated with the video content item synchronously with the leader device. In some embodiments, the leader device can determine whether each identified device is capable of being a candidate follower device based on any suitable information, such as based on a type of device of the identified device, a capability of the identified device, subscription information, and/or any other suitable information, as described in more detail below.

In some embodiments, the leader device can identify any suitable information about each of the one or more identified devices. For example, in some embodiments, the leader device can determine a type of device associated with each of the identified devices. As a more particular example, in some embodiments, the type of device can indicate that the identified device is a speaker, that the identified device is a virtual assistant device that includes a speaker, that the identified device is a streaming media device, and/or any other suitable type of device. As another example, in some embodiments, the leader device can determine a capability of each of the identified devices. As a more particular example, in some embodiments, the leader device can determine whether each identified device is capable of receiving instructions from the leader device (e.g., instructions that include audio presentation timestamps for synchronously presenting the audio content with the leader device, and/or any other suitable instructions). As another more particular example, in some embodiments, the leader device can determine whether each identified device is updated with a particular version of an application to be used for presenting the audio content associated with the video content item. As another more particular example, in some embodiments, the leader device can determine whether each identified device is a device that has a screen or is a screenless device.

Note that, in some embodiments, the leader device can identify a group of devices that have been grouped together. For example, in some embodiments, a group of devices can include any suitable two or more devices that have been explicitly grouped by a user (e.g., a user of the leader device) that are to present media content synchronously when the media content is played by the group of devices. As a more particular example, a group of devices can include: "living room speakers," "den speakers," and "all speakers." In some embodiments, the leader device can determine that two or more devices have been grouped by the user in any suitable manner. For example, in some embodiments, the leader device can query a server to identify a group of devices that were previously grouped by the user. As another example, in some embodiments, the leader device can locally store identifiers of devices that have been grouped by the user.

In some embodiments, the leader device can determine a proximity of each identified device to the leader device. For example, in some embodiments, the leader device can determine that a first identified device (e.g., den speakers) are closer to the leader device than a second identified device (e.g., kitchen speakers).

In some embodiments, the leader device can additionally determine whether a user of the leader device has purchased a particular subscription with a service used for playing, downloading, or streaming the video content item. For example, in some embodiments, the leader device can determine whether the user has purchased a premium subscription that allows the user to cause audio content associated with a video content item to be presented by one or more follower device synchronously with the leader device. In some embodiments, the leader device can determine whether the user has purchased a particular type or level of subscription in any suitable manner. For example, in some embodiments, the leader device can transmit a query to a server associated with a service that provides the video content item, where the query requests account information corresponding to a user account of the user. Note that, in some embodiments, the leader device can store account information that indicates whether the user has purchased a particular subscription or a particular level of subscription to the service.

In some embodiments, the leader device can then determine whether each identified device is capable of being included in the candidate follower devices based on the information associated with each identified device (e.g., device type information, capability information, and/or any other suitable device information) and/or the subscription information. For example, in some embodiments, the leader device can determine that an identified device that is not updated with a particular version of a particular application is not to be included in the candidate follower devices. As another example, in some embodiments, the leader device can determine that none of the identified devices are to be included in the candidate follower devices in response to determining that the user has not purchased a particular subscription or level of subscription. In some embodiments, the leader device can determine whether a particular identified device is to be included in the candidate follower devices based on any suitable combination of device information and subscription information. For example, in some embodiments, the leader device can determine that, in an instance in which the user has purchased a particular subscription or level of subscription, all identified devices are to be included in the candidate follower devices. Conversely, in some embodiments, the leader device can determine that, in an instance in which the user has not purchased a particular subscription or level of subscription, identified devices of a particular type are to be included in the candidate follower devices and/or that identified devices of a particular type are not to be included in the candidate follower devices. As a more particular example, in some embodiments, the leader device can determine that, in an instance in which the user has not purchased a particular subscription or level of subscription, identified devices that do not have a screen (e.g., a screenless virtual assistant device, a speaker, and/or any other suitable screenless device) are not to be included in the candidate follower device.

Figure 2B:
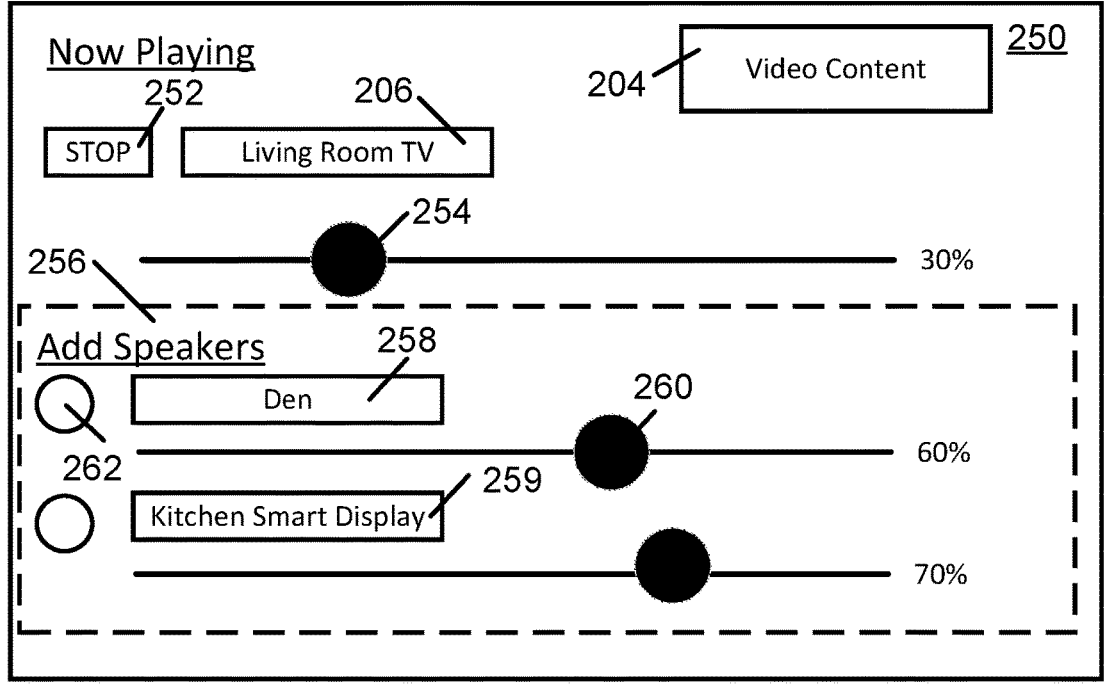

At 108, the leader device can cause a user interface to be presented that indicates the identified candidate follower devices. Turning to FIG. 2B, an example 250 of a user interface that indicates candidate follower devices is shown in accordance with some embodiments of the disclosed subject matter. As illustrated, in some embodiments, user interface 250 can include a stop presentation button 252, a volume indicator 254, and a group of identified candidate follower devices 256.

In some embodiments, stop presentation button 252 can, in response to being selected, cause presentation of the video content item to stop on the leader device. Note that, in some embodiments, stop presentation button 252 can be omitted.

In some embodiments, volume indicator 254 can indicate a current volume of audio content associated with the video content item being presented by the leader device. For example, as shown in FIG. 2A, volume indicator 254 can include a percentage that indicates a current volume relative to a maximum volume possible by the leader device. Additionally, as shown in FIG. 2A, volume indicator 254 can include a slider that can be used to adjust a volume of the audio content on the leader device.

In some embodiments, group of identified candidate follower devices 256 can include any of the one or more follower devices identified as described above in connection with block 106. For example, as shown in FIG. 2A, group of identified candidate follower devices 256 can include a den speaker 258 and a kitchen smart display 259. Note that, although two candidate follower devices are shown in group of identified candidate follower devices 256, in some embodiments, any suitable number (e.g., one, two, five, ten, and/or any other suitable number) of follower devices can be indicated.

Note that, in some embodiments, any suitable error message can be presented in place of group of identified candidate follower devices 256 or in connection with a particular device. For example, in some embodiments, in an instance in which no candidate follower devices have been identified at block 106, an error message can be presented that indicates that no devices were found. As another example, in some embodiments, in an instance in which the leader device determined that a user of the user device has not purchased a particular type of subscription that is required for causing the audio content to be synchronously presented on one or more follower devices, an error message that indicates that purchase of a subscription is required can be presented. In such embodiments, the error message can include a link that, when selected, causes the leader device to navigate to a page for purchasing a subscription to the service required to allow concurrent presentation of the audio content by one or more follower devices. As yet another example, in some embodiments, in an instance in which a particular device has been identified by the leader device, and in which it has been determined that the particular device is not to be included as a candidate follower device because the user of the leader device has not purchased a particular subscription or level of subscription, the identified device can be included in group of identified candidate follower devices 256 in a manner that indicates that the device has been identified but is not currently available for synchronous presentation of audio content. As a more particular example, in some embodiments, the identified device can be listed in group of identified candidate follower devices 256 with the name or identifier of the identified device grayed out and/or presented in any other suitable visual manner that indicates that the device is not currently available as a follower device. Note that, in some embodiments, such an identified device can be presented in connection with a link that, in response to being selected, can cause the leader device to navigate to a page for purchasing the subscription or the level of subscription required to include the identified device as available for synchronously presenting the audio content with the leader device.

In some embodiments, each follower device in group of identified candidate follower devices 256 can include a volume indicator, such as volume indicator 260. In some embodiments, each volume indicator can be used to individually adjust a volume of the audio content presented by the corresponding follower device. In some embodiments, each follower device in group of identified candidate follower devices 256 can be associated with a selection button, such as selection button 262. In some embodiments, selection of selection button 262 can cause the corresponding follower device to be identified by the leader device as a selected follower device, as described below in connection with block 110 of FIG. 1. Note that, in some embodiments, a volume indicator for a particular device can be presented in response to determining that the selection button for the particular device has been selected. For example, in some embodiments, volume indicator 260 corresponding to "den speakers" can be presented in response to determining that selection button 262 has been selected. Additionally, note that, in some embodiments, in instances in which identified devices are included in group of identified candidate follower devices 256 in a grayed out or other visual manner that indicates that the identified device is currently unavailable for synchronous presentation of the audio content, the corresponding volume indicator and/or selection button can be inhibited from presentation on user interface 250.

Note that, in some embodiments, the follower devices included in the group of identified candidate follower devices can be presented in any suitable order. For example, in some embodiments, the follower devices can be presented in alphabetical order. As another example, in some embodiments, the follower devices can be presented in order of proximity to the leader device. As a more particular example, in some embodiments, candidate follower devices that are determined to be closer to the leader device can be presented in a higher position within group of identified candidate follower devices 256. In yet another example, in some embodiments, the follower devices can be presented in order of the number of times a particular follower device has been used to present audio content in connection with a video content item being presented on a particular leader device. As a more particular example, in some embodiments, candidate follower devices that are determined to be more often used to present audio content in connection with the particular leader device can be presented in a higher position within group of identified candidate follower devices 256.

Additionally, note that, in some embodiments, user interface 250 can be presented on a user device other than the leader device. For example, in some embodiments, user interface 250 can be presented on a mobile device (e.g., a mobile phone, a tablet computer, a wearable computer, a laptop computer, and/or any other suitable mobile device) that is paired with the leader device via any suitable connection (e.g., via a Wi-Fi network, via a BLUETOOTH connection, and/or any other suitable type of connection).

Referring back to FIG. 1, in some embodiments, at 110 of process 100, the leader device can receive a selection of one or more follower devices via the user interface. For example, in some embodiments, the leader device can determine that selection buttons corresponding to one or more follower devices have been selected on the user interface, as shown in and described above in connection with FIG. 2B.

Additionally, note that, in some embodiments, a selection of one or more follower devices can be received by a voice recognition circuit of the leader device or by a voice recognition circuit of a mobile device (e.g., a mobile phone, a tablet computer, a wearable computer, a laptop computer, and/or any other suitable mobile device) that is paired with the leader device via any suitable connection (e.g., via a Wi-Fi network, via a BLUETOOTH connection, and/or any other suitable type of connection). For example, in response to receiving a voice command, such as "OK DEVICE, ADD MY LIVING ROOM SPEAKERS," the leader device can determine whether the voice query corresponds with a follower device that is capable of presenting the corresponding audio content of the content item being presented by the leader device.

At 112 of process 100, the leader device can transmit instructions to each of the selected one or more follower devices that cause each follower device to present the audio content associated with the video content item synchronously with the leader device. In some embodiments, the leader device can cause any suitable instructions to be transmitted to each of the selected follower devices. For example, in some embodiments, the instructions can include a link to the video content item that is being presented by the leader device. As another example, in some embodiments, the instructions can include one or more timestamps (e.g., an audio timestamp indicating a playback position in the audio content, and/or any other suitable timestamps) that can be used by each of the follower devices to maintain synchrony while presenting the audio content associated with the video content item. As yet another example, in some embodiments, the leader device can stream audio data (e.g., UDP packets, and/or any other suitable data packets) associated with the audio content to each of the follower devices. As a further example, in some embodiments, the instructions can include start of media stream commands, pause/resume commands (which can include the leader device's timestamp at which to pause or resume), end of media stream command (which can include a sequence number and a timestamp of a final media data frame), and/or volume control commands for each follower device.

Note that, in some embodiments, in instances in which the audio content associated with the video content item is encrypted, the leader device can decrypt the audio content in any suitable manner and using any suitable protocol(s) prior to transmitting the instructions to each of the follower devices. For example, in some embodiments, the instructions can include decrypted audio data corresponding to the decrypted audio content.

Note also that, as described above, in response to the leader device determining that the encrypted audio content associated with the video content item cannot be decrypted, the leader device can prevent the addition of one or more follower devices to present the audio content associated with the video content item.

In some embodiments, the leader device can continue transmitting, at 112 of process 100, instructions to the one or more follower devices that cause each of the follower devices to continue presenting the audio content associated with the video content item in synchrony with the leader device as the leader device continues to present the video content item. For example, in instances in which the instructions include audio timestamps corresponding to audio data to be presented by each of the follower devices, the leader device can calculate updated audio timestamps at any suitable frequency (e.g., once every five seconds, once every ten seconds, and/or at any other suitable frequency), and can transmit the updated audio timestamps to each of the follower devices. In such embodiments, the leader device can calculate the updated audio timestamps based on any suitable information, such as based on a time since playback of the media content item began, based on a sampling rate of the audio content, and/or based on any other suitable information.

In some embodiments, the leader device can transmit updated instructions to each of the follower devices based on receiving any suitable user input that indicates that a manner in which the video content item is presented is to be changed and/or that a playback position of the video content item is to be changed.

For example, in some embodiments, in instances in which the playback modification corresponds to skipping forward or backward within presentation of the video content item, the leader device can transmit updated audio timestamps that correspond to an updated playback position to the follower devices along with instructions to the follower devices to change a playback position of the audio content using the updated audio timestamps. Continuing with this example, in some embodiments, the leader device can synchronously change a playback position of both the video content and the audio content associated with the video content item based on the updated playback position.

As another example, in some embodiments, in instances in which the playback modification corresponds to a volume adjustment, the leader device can transmit instructions to any suitable follower devices in the second group of devices to adjust a volume of the audio content. As a more particular example, in an instance in which the user input indicates that a volume of a particular follower device (e.g., "den speakers," and/or any other suitable follower device) is to be modified, the leader device can transmit a volume control message to the indicated follower device.

Note that, in some embodiments, the user input can be received in any suitable manner. For example, in some embodiments, the user input can be received via user interface 250 of FIG. 2B, described above. As another example, in some embodiments, the user input can be received via a mobile device (e.g., a mobile phone, a tablet computer, a wearable computer, a virtual assistant device, and/or any other suitable device) paired with the leader device that is functioning as a remote control.

In some embodiments, the leader device can transmit control instructions to each of the follower devices in any suitable manner. For example, in some embodiments, the leader device can transmit control instructions using a Wi-Fi network or other local area network to which each of the devices is connected. As another example, in some embodiments, each device can communicate with other devices using BLUETOOTH communication, and/or in any other suitable manner. In another example, in some embodiments, a wireless connection can be established between a computing device and an audio device, such as an ad hoc wireless network connection, a short-range wireless communication protocol (e.g., Bluetooth, Bluetooth Low Energy, Wireless USB, etc.), etc.

At 114 of process 100, the leader device can determine that a second video content item is to be presented by the leader device. In some embodiments, the leader device can determine that the second video content item is to be presented in any suitable manner. For example, in some embodiments, the leader device can determine that the second video content item is a video in a playlist of videos subsequent to the video content item. As another example, in some embodiments, the leader device can determine that a user of the leader device has selected the second video content for presentation (e.g., from a page that indicates available video content items, and/or in any other suitable manner).

At 116 of process 100, the leader device can transmit instructions to each of the follower devices that cause the follower devices to present audio content associated with the second video content item synchronously with the leader device. In some embodiments, the leader device can transmit the instructions to each of the follower devices in any suitable manner. For example, in some embodiments, the leader device can adjust audio timestamps and/or video timestamps associated with the second video content item to allow time for the instructions and/or the audio data to reach the follower devices. As a more particular example, in some embodiments, the leader device can delay presentation of the second video content item by any suitable delay duration (e.g., 300 milliseconds, 400 milliseconds, 500 milliseconds, and/or any other suitable delay). Continuing with this example, in some embodiments, the leader device can add the same delay duration to the audio timestamps associated with the audio content such that the leader device and each of the follower devices present the audio content synchronously.

In some embodiments, during the time period from initiation of presentation of the second video content item by the leader device until the delay duration has elapsed, the leader device can transmit instructions to each follower device that cause each follower device to present silent audio content. For example, in some embodiments, the leader device can transmit audio data that corresponds to silence to correspond to delay in the presentation of the second video content item. As a more particular example, in some embodiments, the leader device can transmit silent audio data to each of the follower devices for a duration of time corresponding to the delay duration added to the audio timestamps, as described above.

Figure 3:
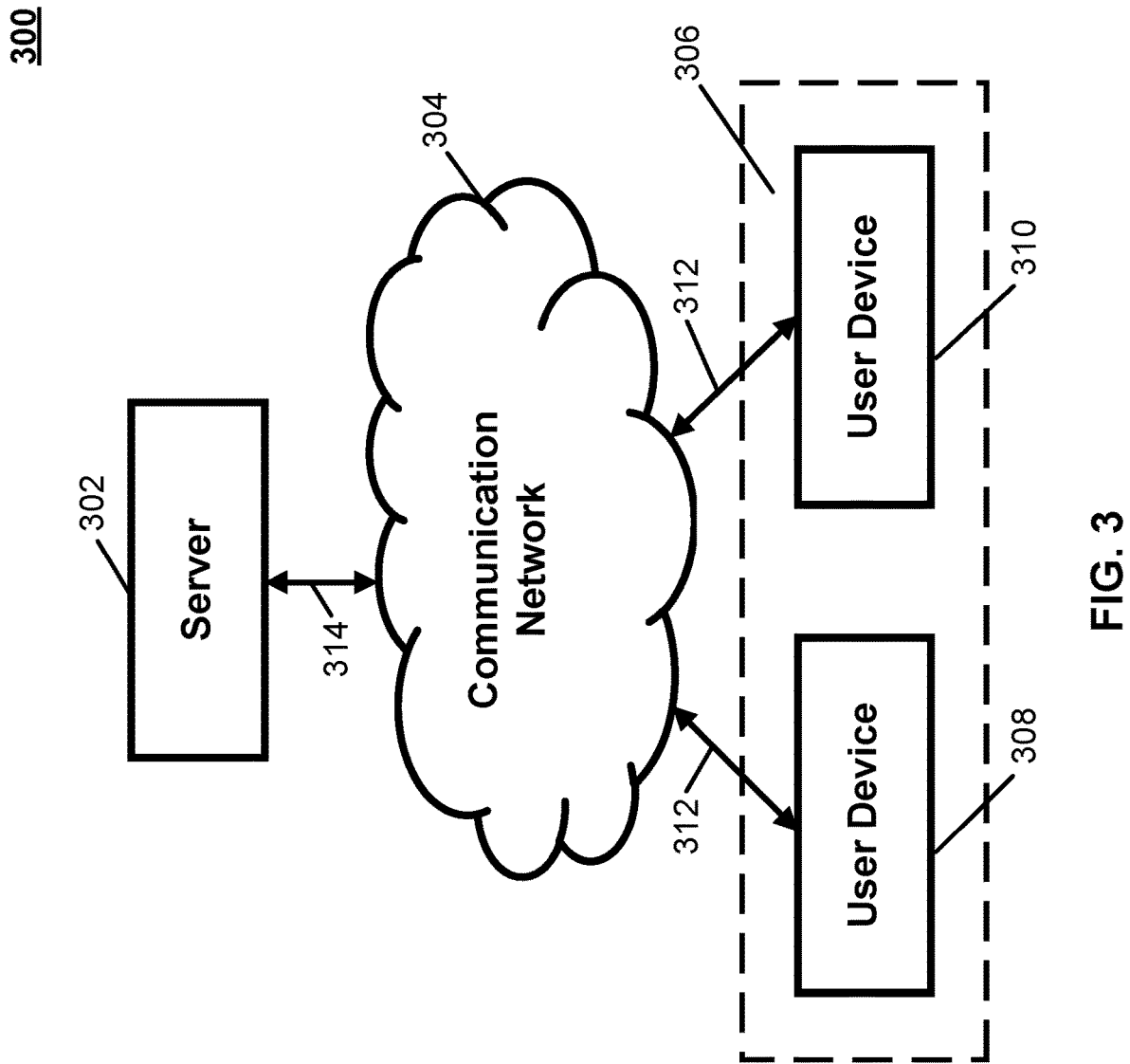
FIG. 3 shows a schematic diagram of an illustrative system suitable for implementation of mechanisms described herein for providing dynamic media sessions with audio stream expansion features in accordance with some embodiments of the disclosed subject matter.

Turning to FIG. 3, a schematic diagram of an illustrative system 300 suitable for implementation of mechanisms described herein for providing dynamic media sessions with audio stream expansion features that can be used in accordance with some embodiments of the disclosed subject matter is shown. As illustrated, hardware 300 can include a server 302, a communication network 304, and/or one or more user devices 306, such as user devices 308 and 310.

Server 302 can be any suitable server(s) for storing information, data, and/or media content. For example, in some embodiments, server 302 can store media content items, which can be transmitted to user devices 306 for presentation. In such embodiments, the media content items can include any suitable types of media content, such as videos, movies, television programs, live-streamed content, audio content (e.g., music, audiobooks, radio programs, and/or any other suitable audio content), and/or any other suitable type of media content. In such embodiments, server 302 can be associated with any suitable video content sharing or streaming service, media content sharing or streaming service, social networking service, and/or any other suitable service. As another example, in some embodiments, server 302 can be associated with a content casting service for storing information associated with any suitable media playback sessions in which multiple user devices (e.g., televisions, speakers, virtual assistant devices, etc.) are grouped together to synchronously present media content.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for presenting video content and/or audio content. For example, in some embodiments, user devices 306 can include speakers, a television, a media player, a game console, a mobile phone, a tablet computer, a desktop computer, a vehicle entertainment system, a wearable computer, and/or any other suitable type of user device.

In some embodiments, user device 306, such as a media presentation device or a media receiver device, can determine, via device discovery requests, that user devices 306 are multiple speakers within a particular proximity of user device 306 that have desirable audio playback capabilities in comparison with user device 306 having desirable video playback capabilities (e.g., a display having a particular resolution, a display having particular dimensions, etc.) and undesirable audio playback capabilities.

Note that, in some embodiments, a particular user device of user devices 306 can be included in a group of devices that synchronously present media content, as described above in connection with FIG. 1. In such embodiments, a particular user device can be a leader device or a follower device. Additionally note that, a particular user device can be a leader device in connection with a media playback session, such as a cast session, and a follower device in connection with a different media playback session, such as a different cast session.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
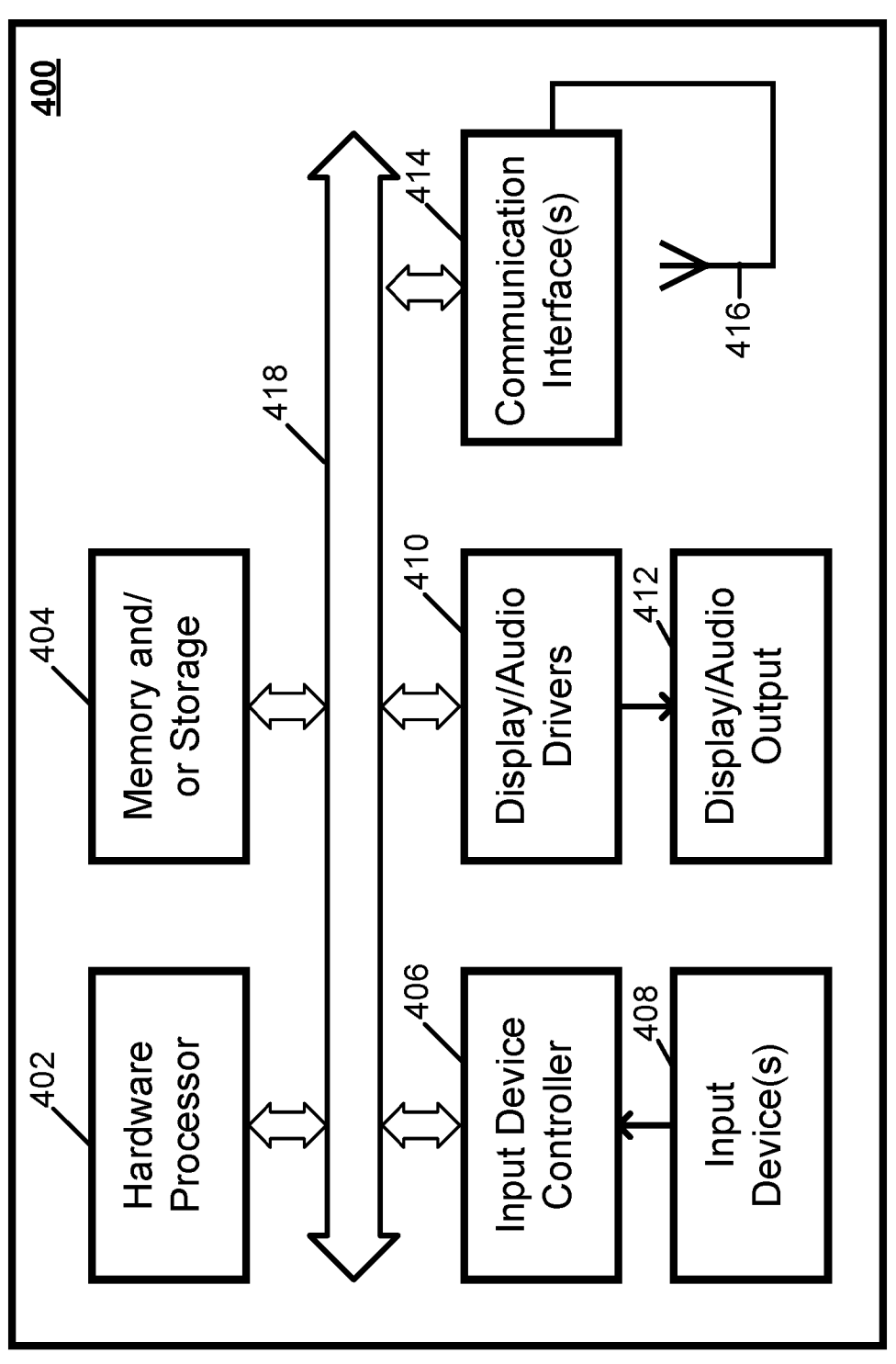
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for providing dynamic media sessions with audio stream expansion features are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for media playback, the method comprising:
creating a group of devices that are explicitly grouped together by a user;
causing media content to be presented by a leader device;
receiving a voice command to alter presentation of the media content, wherein the voice command indicates the group of devices explicitly grouped together by the user;
identifying a candidate follower device and a non-candidate follower device from the group of devices, wherein:
the candidate follower device and the non-candidate follower device each have a characteristic, and the characteristic of the candidate follower device is different than the characteristic of the non-candidate follower device; and
the characteristic is indicative of whether the corresponding device has a display screen; and
transmitting, to the candidate follower device, a control instruction that causes the media content to be presented synchronously by the candidate follower device with the media content presented by the leader device.

2. The method of claim 1, wherein identifying the candidate follower device and the non-candidate follower device from the group of devices is based on a second characteristic selected from the group consisting of:
an indication that the user has purchased a subscription to a service; and
an indication that the user has purchased a particular level of subscription to the service.

3. The method of claim 2, wherein the service is associated with the media content.

4. The method of claim 1, wherein a volume indicator is presented in association with the candidate follower device but not in association with the non-candidate follower device.

5. The method of claim 1, wherein transmitting the control instruction comprises transmitting an audio timestamp in association with audio content associated with the media content.

6. The method of claim 1, wherein a separate volume indicator is presented in association with each candidate follower device of a group of candidate follower devices.

7. A system for media playback, the system comprising:
a leader device;
a plurality of candidate follower devices, wherein the system is configured to:
create a group of devices that are explicitly grouped together by a user;
cause media content comprising video content and audio content to be presented by the leader device;
receive a voice command to alter presentation of the media content, wherein the voice command indicates the group of devices explicitly grouped together by the user;
identify a plurality of devices connected to a local area network with which the leader device is connected from the group of devices;
identify the plurality of candidate follower devices and a non-candidate follower device from the plurality of devices connected with the local area network, wherein:
each of the plurality of candidate follower devices and the non-candidate follower device have a respective characteristic, and the characteristic of the plurality of candidate follower devices is different than the characteristic of the non-candidate follower device,
the characteristic is indicative of whether the corresponding device has a display screen; and
transmit, to the plurality of candidate follower devices, a control instruction that causes the audio content of the media content to be presented synchronously by the group of devices with the media content presented by the leader device.

8. The system of claim 7, wherein a second characteristic is selected from the group consisting of:
an indication that the user who has purchased a subscription to a service; and
an indication that the user who has purchased a particular level of subscription to the service.

9. The system of claim 8, wherein the service is associated with the media content.

10. A system for media playback, the system comprising:
a leader device;
a plurality of candidate follower devices, wherein the system is configured to:
create a group of devices that are explicitly grouped together by a user;
cause media content comprising video content and audio content to be presented by the leader device;
receive a voice command to alter presentation of the media content, wherein the voice command indicates the group of devices explicitly grouped together by the user;
identify a plurality of devices connected to a local area network with which the leader device is connected;
identify the plurality of candidate follower devices and a non-candidate follower device from the plurality of devices connected with the local area network, wherein:
each of the plurality of candidate follower devices and the non-candidate follower device have a characteristic, and the characteristic of the plurality of candidate devices is different than the characteristic of the non-candidate follower device, and cause a user interface to be presented that presents the plurality of candidate follower devices;

cause a selection button to be presented in association with each of the plurality of candidate follower devices but not in association with the non-candidate follower device; and transmit, to the plurality of candidate follower devices, a control instruction that causes the audio content of the media content to be presented synchronously by the group of devices with the media content presented by the leader device.

11. The system of claim 7, wherein a volume indicator is presented in association with each of the plurality of candidate follower devices but not in association with the non-candidate follower device.

* * * * *